United States Patent

Stephens

[15] 3,658,227

[45] Apr. 25, 1972

[54] TAPE GUIDE SPINDLE

[72] Inventor: John F. Stephens, 2302-B North Ontario Street, Burbank, Calif. 91504

[22] Filed: Apr. 3, 1970

[21] Appl. No.: 25,373

[52] U.S. Cl. ....................226/196

[51] Int. Cl. ....................B65h 23/26

[58] Field of Search ....................226/190, 194, 191, 196, 198, 226/199; 242/76

[56] References Cited

UNITED STATES PATENTS 2,715,024 8/1955 Nydegger et al. ....................226/191

2;804,300 8/1957 Bilane ....................226/191

*Primary Examiner*—Allen N. Knowles

*Attorney*—Beehler & Arant

[57] ABSTRACT

An inner sleeve fixed in position on a shaft has an outer sleeve carried by it, over which a relatively wide magnetic tape is adapted to travel. The inside cylindrical surface of the outer sleeve is larger than the outside cylindrical surface of the inner sleeve and is held in uniform spaced relationship with it by an O-ring of resilient material located midway between opposite ends, so that the outer sleeve can tilt to accommodate a tape which approaches the outer sleeve in a position out of proper alignment.

5 Claims, 5 Drawing Figures

INVENTOR.
JOHN F. STEPHENS
By Beehler & Arant
ATTORNEYS.

TAPE GUIDE SPINDLE

A common expedient for guiding magnetic tape from a feed reel, over a recording or reproducing head to a take-up reel is to provide tape guide spindles over which the tape can travel when it changes direction in its path of travel. There are usually two, although sometimes four, such tape guide spindles in a conventional system. Although no appreciable difficulty has been experienced in the use of narrow magnetic tape, an inch or less in width, when one or another of the reels is other than in perfect alignment, appreciable difficulty is experienced in handling relatively wide tape. Often when there is an unavoidable shifting of one or another of the reels the tape will have a slight misalignment with respect to the tape guide spindles which causes the tape to wrinkle at one or both edges. When this happens to relatively wide tape of the kind used in television monitoring, for example, playback from the tape is distorted to a very troublesome degree.

It is therefore among the objects of the invention to provide a new and improved tape guide spindle which automatically compensates for tape misalignment and avoids prospect of misaligned tape being mechanically distorted.

Another object of the invention is to provide a new and improved tape guide spindle which has a central member fixed in position and an outer member only which automatically adjusts itself to the position of a tape which is traveling over it in a position somewhat out of alignment.

Still another object of the invention is to provide a new and improved tape guide spindle capable of automatically adjusting itself in position to accommodate a tape which is traveling somewhat out of alignment, the spindle being simple, compact and of such form and size that it can be substituted in systems heretofore employing only non-adjustable tape guide spindles, without need for changing the system in any other way.

With these and other objects in view, the invention consists in the construction, arrangement and combination of the various parts of the device whereby the objects contemplated are attained, as hereinafter set forth, pointed out in the appended claims and illustrated in the accompanying drawings.

Figures 1, 2, 3, 4, 5:
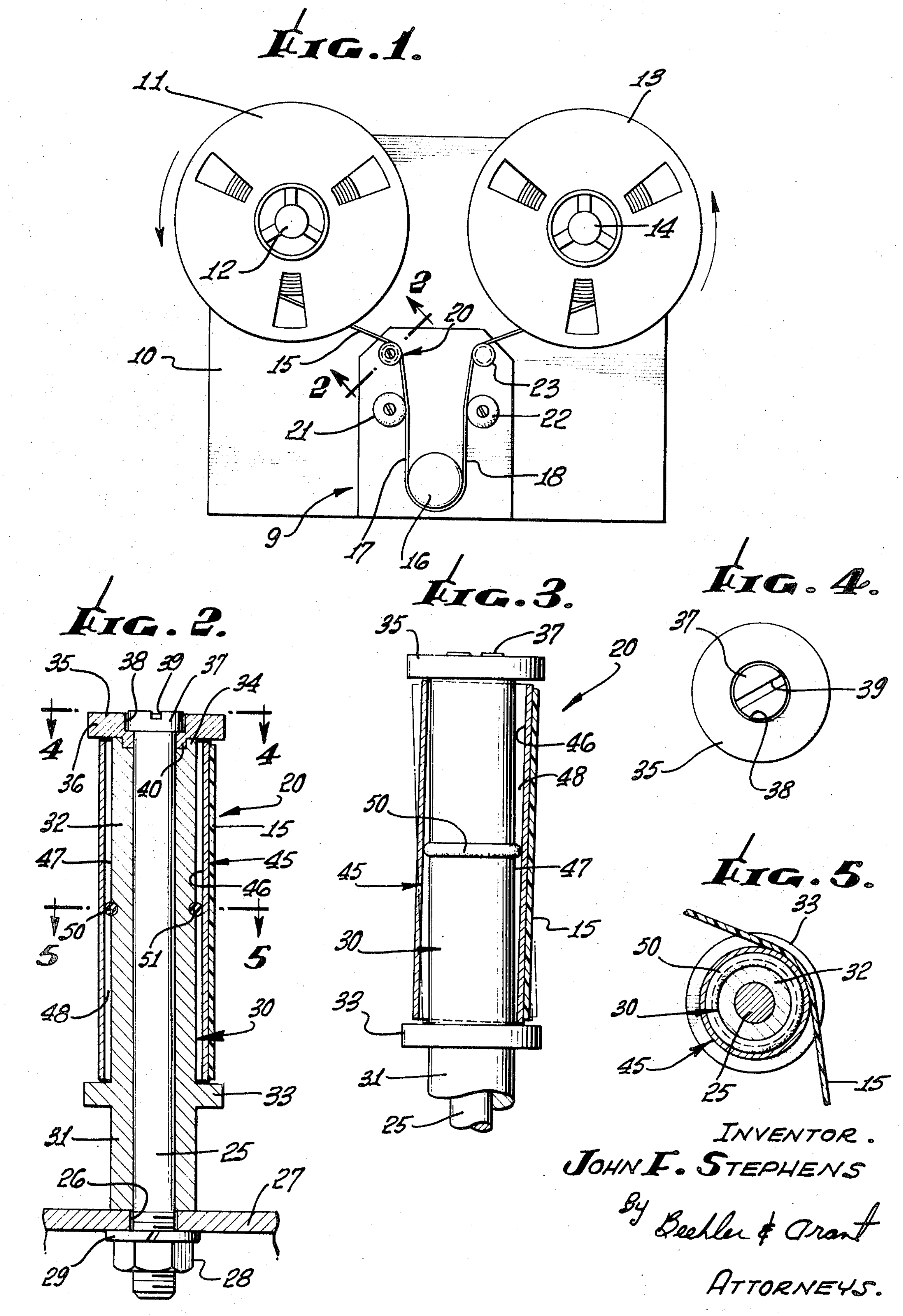
FIG. 1 is a plan view of a tape travel system in which the tape guide spindle is operative.
FIG. 2 is a longitudinal sectional view of the tape guide spindle in the normal adjustment.
FIG. 3 is a longitudinal sectional view of the tape guide spindle in an accommodation adjustment position.
FIG. 4 is a plan view on the line 4—4 of FIG. 2.
FIG. 5 is a cross sectional view on the line 5—5 of FIG. 2.

In an embodiment of the invention chosen for the purpose of illustration there is shown a tape guide system indicated generally by the reference character 9 mounted on a chassis 10 and including a feed reel 11 on a shaft 12 and a take-up reel 13 on a shaft 14.

Tape 15 unwinds from the feed reel 11 and, in passing to the take-up reel 13 is threaded through the system 9. The location of a sound head 16, over which the tape is guided makes it necessary for the tape to assume two loops 17 and 18 in the course of which the tape changes its direction of travel.

In passing from the feed reel 11 the tape 15 passes around a tape guide spindle 20, then over a second tape guide spindle 21 from which it passes around the sound head 16, reversing direction. A tape guide spindle 22 receives the tape from the sound head 16, passing it to a tape guide spindle 23 from which it passes to the take-up reel 13.

In the chosen embodiment the tape guide spindle 20 is built in accordance with the invention so as to be automatically adjustable. To accomplish this there is provided a central fixed shaft 25 which extends through a hole 26 in the plate 27 of the chassis 9 in which it is anchored by a nut 28 and lock washer 29. Surrounding the shaft 25 is an inner sleeve 30 having a lower shank 31 and an upper shank 32 separated by an annular flange 33. Outwardly relative to a free stepped end 34 of the inner sleeve 30 is a washer 35 forming another annular flange 36 which overlies the stepped end 34. A head 37 on the shaft 25 fits in a recess 38 of the head 35 and is provided with a screwdriver slot 39 for use in anchoring the inner sleeve 30 in fixed position on the chassis. A shoulder 40 on the inside face of the washer 35 in engagement with the stepped end 34 assists in centering the mounting of the inner sleeve 30.

Adjustment to accommodate misalignment of the tape is provided by an outer floating sleeve 45, the cylindrical interior surface 46 which has a diameter appreciably larger than the diameter of the cylindrical exterior surface 47 of the inner sleeve 30, leaving an annular space 48 therebetween.

To hold the outer sleeve 45 in a properly spaced position, use is made of a resilient spacer here taking the form of an O-ring 50. An annular groove 51 in the interior sleeve 30, midway between the flanges 33 and 36 holds the O-ring in its proper position. It is significant that the length of the outer sleeve 45 is less than the distance between the flanges 33 and 36 so that the sleeve is free to tilt about the O-ring as a fulcrum.

In operation, should there by a misalignment of the tape in its course of travel, which is due on occasion to one reel or another not being in precise position on its shaft, or perhaps to an irregularity in winding of the tape on a reel, the tape will force the outer sleeve to a tilted position, as suggested by FIG. 3, and avoid wrinkling or distortion of the tape at one or both edges, a condition which may otherwise occur.

By use of a single adjustable tape guide spindle, irregularities in tape travel originating in either reel during either forward or rewind operation are accommodated. For additional adjustment to insure against exaggerated misalignment, the tape guide spindle 23 may be built in the same manner as the tape guide 20 heretofore described in detail.

Having described the invention, what is claimed as new in support of Letters Patent is:

1. A tape guide spindle for non-yieldable tape comprising an inner relatively stationary member having a cylindrical exterior surface, an outer sleeve surrounding the inner sleeve, said outer sleeve being longer than the width of the tape, the outer sleeve having a cylindrical interior of diameter greater than the exterior diameter of the cylindrical exterior surface of the stationary member and an exterior tape engaging surface, and yieldable means intermediate opposite ends of the outer sleeve comprising a spacer adjacent the midportion and tiltably supporting the midportion only of said outer sleeve at a location clear of said cylindrical exterior surface in a manner allowing unrestricted tilt of either end said outer sleeve in response to pressure thereon of tape which is in a position other than parallel to the exterior tape engaging surface.

2. A tape guide spindle as in claim 1 wherein said yieldable means comprises an annular ring of resilient material having a substantially equal breadth and thickness fixed in position between opposite ends of the outer sleeve and wherein said outer sleeve tilts about said ring as a fulcrum.

3. A tape guide spindle as in claim 1 wherein said relatively stationary member comprises a central shaft in fixed position and an inner sleeve surrounding and mounted on said shaft.

4. A tape guide spindle as in claim 1 wherein there are annular flanges on the relatively stationary member spaced apart a distance exceeding the width of the tape whereby to provide guides for respective edges of the tape.

5. A tape guide spindle for non-yieldable tape comprising an inner relatively stationary member having a cylindrical exterior surface, an outer sleeve surrounding the inner sleeve, said outer sleeve being longer than the width of the tape, the outer sleeve having a cylindrical interior of diameter greater than the exterior diameter of the cylindrical exterior surface of the stationary member and exterior tape engaging surface, and yieldable means intermediate opposite ends of the outer sleeve comprising a spacer yieldably holding said outer sleeve away from said cylindrical exterior surface in a manner allowing said outer sleeve to tilt in response to pressure thereon of tape which is in a position other than parallel to the exterior tape engaging surface, and means forming an annular groove in the exterior surface of the inner sleeve at a location midway between opposite ends of the outer sleeve, said yieldable means comprising an O-ring secured in said annular groove.

* * * * *